(12) United States Patent
Berger et al.

(10) Patent No.: US 8,601,361 B2
(45) Date of Patent: Dec. 3, 2013

(54) AUTOMATICALLY POPULATING AND/OR GENERATING TABLES USING DATA EXTRACTED FROM FILES

(75) Inventors: Peter Glen Berger, Irwin, PA (US); Jay Christopher Capela, Santa Cruz, CA (US); Yaniv Gur, Pittsburgh, PA (US); Roger Rock Rosner, Mountain View, CA (US); Christopher Douglas Weeldreyer, San Carlos, CA (US)

(73) Assignee: Apple Inc., Cupertino, CA (US)

(*) Notice: Subject to any disclaimer, the term of this patent is extended or adjusted under 35 U.S.C. 154(b) by 1193 days.

(21) Appl. No.: 11/890,612

(22) Filed: Aug. 6, 2007

(65) Prior Publication Data
US 2009/0044095 A1 Feb. 12, 2009

(51) Int. Cl.
*G06F 17/27* (2006.01)

(52) U.S. Cl.
USPC ........... 715/227; 715/224; 715/225; 715/226; 715/234; 715/239

(58) Field of Classification Search
USPC ................... 715/224–227, 234, 239
See application file for complete search history.

(56) References Cited

U.S. PATENT DOCUMENTS

| | | | | |
|---|---|---|---|---|
| 5,485,550 A * | 1/1996 | Dalton | ............... | 706/52 |
| 5,721,911 A * | 2/1998 | Ha et al. | ............... | 1/1 |
| 6,601,071 B1 * | 7/2003 | Bowker et al. | ............... | 715/234 |
| 6,631,497 B1 * | 10/2003 | Jamshidi et al. | ............... | 715/205 |
| 6,662,340 B2 * | 12/2003 | Rawat et al. | ............... | 715/236 |
| 6,991,158 B2 * | 1/2006 | Munte | ............... | 235/379 |
| 7,007,033 B1 * | 2/2006 | Rothschiller et al. | ............... | 1/1 |
| 7,017,112 B2 * | 3/2006 | Collie et al. | ............... | 715/212 |
| 7,254,581 B2 * | 8/2007 | Johnson et al. | ............... | 707/627 |
| 7,581,170 B2 * | 8/2009 | Baumgartner et al. | ....... | 715/234 |
| 7,657,549 B2 * | 2/2010 | Morris et al. | ......... | 707/999.101 |
| 7,685,204 B2 * | 3/2010 | Rogers | ............... | 707/770 |
| 7,941,743 B2 * | 5/2011 | Reddy et al. | ............... | 715/221 |
| 8,060,518 B2 * | 11/2011 | Timmons | ............... | 707/755 |
| 2002/0083096 A1 | 6/2002 | Hsu et al. | | |
| 2004/0181749 A1 * | 9/2004 | Chellapilla et al. | ............... | 715/505 |
| 2005/0060324 A1 * | 3/2005 | Johnson et al. | ............... | 707/100 |
| 2005/0076013 A1 * | 4/2005 | Hilbert et al. | ............... | 707/3 |
| 2005/0251812 A1 * | 11/2005 | Hayward | ............... | 719/328 |
| 2006/0112329 A1 * | 5/2006 | Collie et al. | ............... | 715/513 |
| 2006/0123010 A1 * | 6/2006 | Landry et al. | ............... | 707/10 |
| 2008/0306983 A1 * | 12/2008 | Singh | ............... | 707/102 |
| 2009/0171910 A1 * | 7/2009 | Sarkeshik | ............... | 707/3 |

OTHER PUBLICATIONS

Stinson et al.; Microsoft® Office Excel 2003; Microsoft Press; Sep. 3, 2003; pp. 685 and 689-692.*
CardScan User's Guide; 2002; Corex Technologies Corporation; pp. 1-1 to 11-2.*
Getting Started with CardScan; 2006; CardScan, Inc.; pp. 1 to 5-2.*
"Metadata;" Microsoft Computer Dictionary; May 1, 2002; Microsoft Press; 5th Edition; p. 425.*

* cited by examiner

*Primary Examiner* — Doug Hutton, Jr.
*Assistant Examiner* — Andrew Dyer
(74) *Attorney, Agent, or Firm* — Fletcher Yoder PC

(57) ABSTRACT

Automatically populating and/or generating tables using data extracted from files is disclosed. In some embodiments, in response to receiving an indication that at least a portion of a data object is desired to be included in a table, a set of one or more data values associated with the data object is selected for inclusion in the table and automatically included as an entry corresponding to the data object in the table. In various embodiments, the table may comprise an existing table and/or a newly generated table.

27 Claims, 9 Drawing Sheets

| | A | B |
|---|---|---|
| | Name | Email |
| 1 | Shane Green | shane@apple.com |
| 2 | Mark Jones | mark@apple.com |
| 3 | Julie Wilson | julie@apple.com |
| 4 | Justin Baker | justin@apple.com |

| | A |
|---|---|
| | Name |
| 1 | |
| 2 | Shane Green |
| 3 | Mark Jones |
| 4 | Julie Wilson |
| 5 | Justin Baker |

302

| Name: | Steve Jobs | |
|---|---|---|
| Business Phone: | (312) 456-7890 | |
| Mobile Phone: | (879) 654-3210 | |
| Home Phone: | (542) 859-4586 | |
| Business Fax | (567) 583-4128 | |
| Business Address: | 1 Infinite Loop, Cupertino, CA 95014 | |
| Email | steve@apple.com | |

AUTOMATICALLY POPULATING AND/OR GENERATING TABLES USING DATA EXTRACTED FROM FILES

BACKGROUND OF THE INVENTION

Typically, data is manually entered into spreadsheet cells. In typical spreadsheet applications, a limited ability to import objects, such as data-containing objects from other applications, has been provided. For example, it may be possible in such a typical spreadsheet application to import a set of one or more objects, such as one or more address cards or contacts from an email or other communication and/or productivity application, into a spreadsheet of the spreadsheet application, with the result that the spreadsheet application would parse the object(s) and include data elements comprising each object in one or more corresponding cells of a corresponding row of the spreadsheet. In the case of at least one typical spreadsheet application, a header row may be generated automatically, based on metadata included in and/or common to the object(s), such as attribute and/or field names associated with the data elements, e.g., "first name", "last name", "business phone", etc. However, typically all data elements and associated metadata of the object(s) and/or a particular view thereof in the source application are included, indiscriminately, in the spreadsheet. Also, typically importation of subsequent objects of the same type and/or from the same source and to the same destination results in another and redundant header row being generated.

BRIEF DESCRIPTION OF THE DRAWINGS

Various embodiments of the invention are disclosed in the following detailed description and the accompanying drawings.

FIG. 3A illustrates an existing table.

FIG. 3B illustrates dragging a data object onto an existing table.

DETAILED DESCRIPTION

Figure 1A:
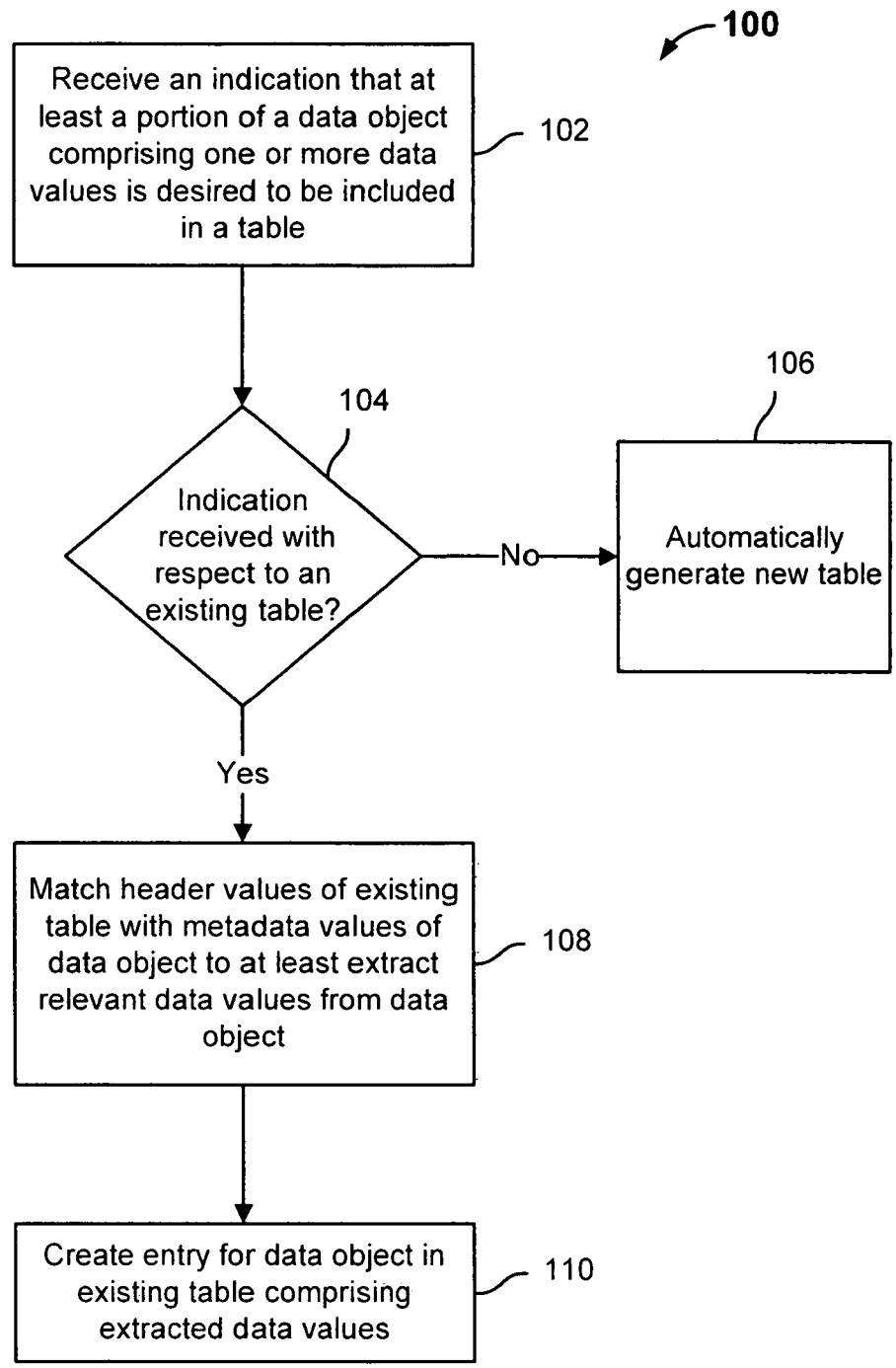
FIG. 1A illustrates an embodiment of a process for automatically populating a table.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Automatically populating and/or generating tables using data extracted from files is disclosed. In some embodiments, in response to receiving an indication that at least a portion of a data object is desired to be included in a table, a set of one or more data values associated with the data object is selected for inclusion in the table and automatically included as an entry corresponding to the data object in the table. In various embodiments, the table may comprise an existing table and/or a newly generated table.

Although the examples provided herein are with respect to a particular spreadsheet application, the techniques described herein may be employed with respect to any application, spreadsheet or otherwise, in which it would be useful to automatically populate and/or generate tables, cells, and/or other objects using data extracted from files. The workspace of the spreadsheet application described in some of the examples herein comprises an infinite or seemingly infinite canvas on which one or more finite objects, such as tables, text, charts, graphs, shapes, images, photographs, graphics, animations, multimedia content, etc., may be placed. However, the techniques disclosed herein are not limited to use in a spreadsheet or other application having such a workspace. Depending on its type, an object may have at least standard spreadsheet functionality associated with it. For example, a table object is comprised of a desired number of rows and columns of cells which are associated with at least standard spreadsheet functionality associated with cells. The term "at least standard spreadsheet functionality" in the context of cells of a table includes the ability to define the content of one cell in such a way that the content of the one cell is determined based at least in part on the content of one or more other cells, and the content of the one cell is updated automatically without further human action if the content of one or more of the one or more other cells is changed. In some embodiments, a table object may include one or more of a header row and a header column, and values may be entered into one or more header cells, e.g., to label an associated column or row. The techniques disclosed herein are not limited to use with respect to such table objects and may be similarly employed with respect to any other table and/or cell configurations or organizations, such as the (seemingly) infinite single grid or table of cells in each sheet of some typical spreadsheet applications that includes an unlimited (or very large) number of rows and columns of cells. Although some of the given examples are described with respect to automatically populating and/or generating tables, the techniques described herein may be employed to automatically populate and/or generate other objects such as, e.g., charts or graphs.

In some embodiments, as disclosed herein, at least a portion of a table may be automatically populated with data extracted from one or more data objects or files, e.g., from another application. In various embodiments, data elements comprising a set of one or more objects, and associated metadata if required and/or applicable, are imported and corresponding data values included in a table in a selective and/or intelligent manner, as described further herein.

FIG. 1A illustrates an embodiment of a process for automatically populating a table. In some embodiments, process 100 is employed with respect to FIGS. 3A-3C. Process 100 starts at 102 at which an indication that at least a portion of a data object comprising one or more data values is desired to be included in a table is received. In various embodiments, the indication of 102 is received in response to the data object being dragged and dropped on or otherwise selected and/or opened with respect to a (empty) workspace or a table already existing in the workspace. In some embodiments, the data object includes for one or more data values corresponding metadata values that provide labels or identification information for associated data values. At 104 it is determined if the indication of 102 is received with respect to an existing table. If it is determined at 104 that the indication of 102 is not received with respect to an existing table, a new table is automatically generated at 106, e.g., using process 120 of FIG. 1B as further described below. If it is determined at 104 that the indication of 102 is received with respect to an existing table, at 108 header values of the existing table and metadata values of the data object are matched using an appropriate matching algorithm, as further described below, and relevant data values of the data object that correspond to the header values of the existing table as determined from the matching are, if available, extracted from the data object for inclusion in an entry of the data object in the table. At 110, an entry comprising the relevant data values of the data object extracted at 108 is created in the existing table, with the location of each data value in the entry based on its corresponding metadata value and/or the header value of the existing table with which the corresponding metadata value matched. In some embodiments, 108 of process 100 includes extracting one or more metadata values of the data object and/or other data values that are not relevant (i.e. that do not correspond to header values of the existing table). In some embodiments, when data values associated with the data object are entered into the existing table, e.g., at 110, no existing data included in the table is altered or affected in any way. In some embodiments, if no matches are found at 108, an entry for the data object is not created in the existing table at 110. In some embodiments, if no matches are found at 108, process 100 continues at 106 at which a new table is automatically generated, e.g., using process 120 of FIG. 1B as further described below, for the data object. In some embodiments, if no matches are found at 108, new rows and/or columns with header values corresponding to one or more metadata values of the data object are created in the existing table to accommodate an entry for the data object in the existing table. In some such cases, for example, a process similar to process 120 of FIG. 1B is employed to determine which rows/columns header values to include in the existing table and create and entry in the existing table for the data object.

In some embodiments, dragging and dropping or otherwise selecting and/or opening a data object with respect to an empty workspace or an empty portion of a workspace of a document results in the automatic generation of a new table in the document that is at least in part populated with at least a subset of data extracted from the data object. In some embodiments, one or more metadata values included in the data object are employed to at least in part define the structure of the generated table and/or populate one or more header cells of the generated table, and data values corresponding to the metadata values are employed to populate corresponding cells of an entry of the data object in the generated table. In some embodiments, as described below with respect to FIG. 1B, a template associated with the data object type of the data object is employed to at least in part define the structure of a generated table.

Figure 1B:
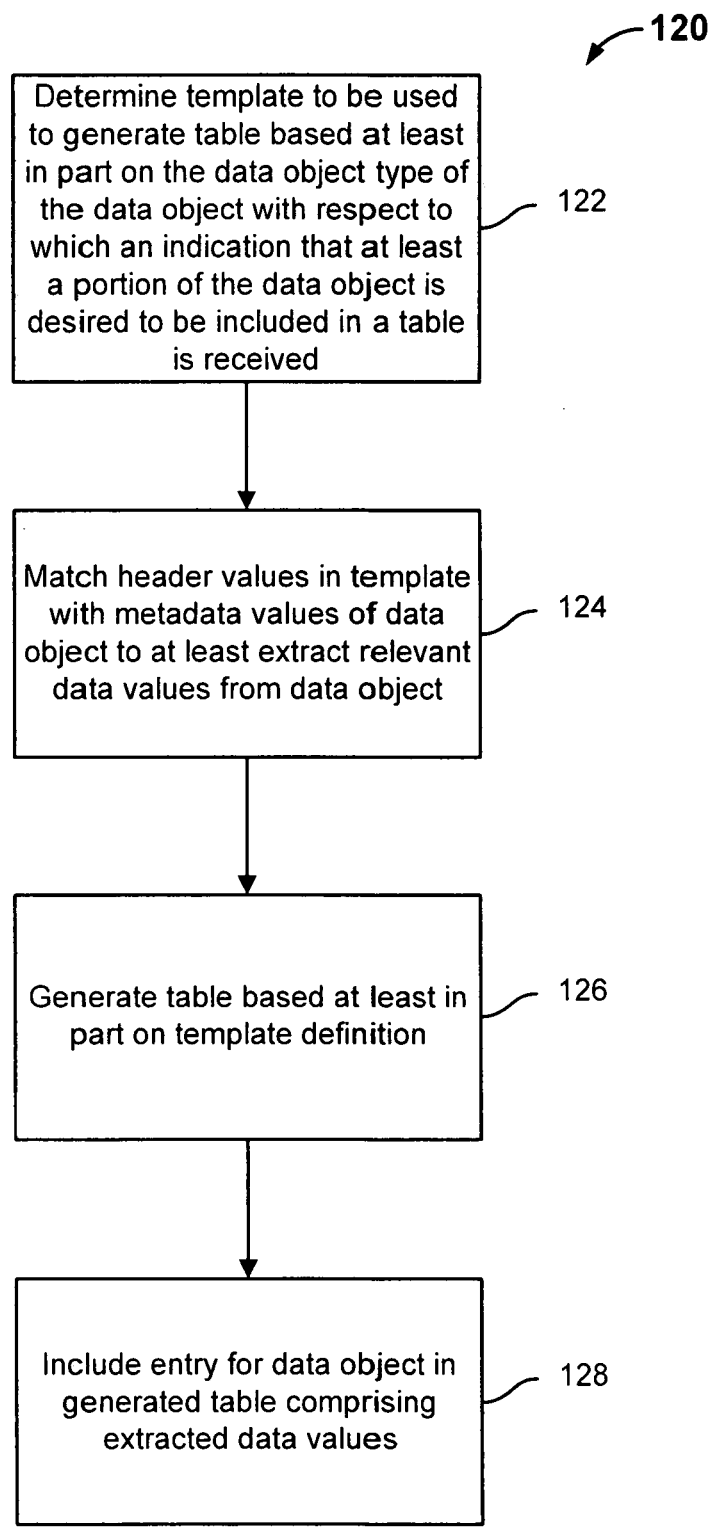
FIG. 1B illustrates an embodiment of a process for automatically generating and populating a table.

FIG. 1B illustrates an embodiment of a process for automatically generating and populating a table. In some embodiments, process 120 is employed at 106 of process 100 of FIG. 1A. In some embodiments, process 120 is employed with respect to FIGS. 2A-2D. Process 120 starts at 122 at which the template to be used to generate a table is determined based at least in part on the data object type of a data object with respect to which an indication that at least a portion of the data object is desired to be included in a table is received. In some embodiments, a template associated with a data object type comprises a prescribed set of relevant header values (which may be predefined and/or user-defined and/or configurable) that at least in part defines the default columns and/or rows to be included in a table generated for a particular data object type. In some embodiments, a data object type of a data is determined from its associated file extension. At 124, header values of the template selected at 122 and metadata values of the data object are matched using an appropriate matching algorithm, as further described below, and at least relevant data values of the data object that correspond to the header values of the template as determined from the matching are, if available, extracted from the data object for inclusion in an entry of the data object in the table. In some embodiments, 124 includes extracting one or more metadata values of the data object and/or other data values that are not relevant (i.e. that do not correspond to header values of the template). At 126, the table is generated based at least in part on the template definition. In various embodiments, header values from the template and/or corresponding (i.e. matching) metadata values of the data object may be employed to populate header cells of the default columns and/or rows included in the generated table. In some embodiments, the generated table includes only the default columns and/or rows defined by the template for which corresponding data values are available in the data object, i.e. columns and/or rows corresponding to the relevant data values extracted at 124. At 128, an entry comprising the relevant data values of the data object extracted at 124 is included in the generated table, with the location of each data value in the entry based on its corresponding metadata value and/or the header value of the template with which the corresponding metadata value matched.

Although described for a single data object, processes 100 and 120 of FIGS. 1A and 1B, respectively, may be similarly employed for a plurality of data objects, e.g., that are simultaneously dragged and dropped onto an existing table or workspace. In some embodiments, one or more header cell values of an existing table or a generated table in which an entry for a data object is included may comprise one or more metadata values of the data object. In some embodiments, metadata values and/or data values extracted from a data object but not included in an existing table or a generated table are preserved with respect to the table in hidden columns and/or rows that can be included in the table by unhiding the associated columns and/or rows. In some embodiments, the entry for a data object in a table comprises a row or column of the table. In some embodiments, multiple entries may be inserted into a generated or existing table for a data object based on the type of the data object and/or the data values included in the data object. In some embodiments, data included in a data object may be separated out into multiple (generated and/or existing) tables. For example, financial data included in a data object comprising a file with, e.g., a .ofx or .qfx extension, may be separated out into multiple tables. In various embodiments, a data object may comprise any appropriate file or file type that includes one or more associated data values, such as an address card, music or other multimedia file, image file, file with financial data, etc. In some embodiments, a data object may not include metadata values for one or more included data values. In some such cases, a table may be populated and/or generated using one or more "raw" data values without using any matching algorithm, e.g., between metadata values and existing or template header values.

In some embodiments, in order to correctly and intelligently populate an entry of a data object in a table with data extracted from the data object, header values associated with an existing table or a template and metadata values associated with the data object are matched, such as at 108 of process 100 and 124 of process 120. In some embodiments, a "fuzzy" matching technique is employed to match synonymous values, e.g., when exact matches are not found. Such a fuzzy matching technique allows, for instance, synonymous values such as "Phone Number" and "Ph #" or "Last Name" and "Surname" to be matched. In some embodiments, multiple data values of a data object may be merged when entered into a table. For example, in some embodiments, if a table includes a column with header value "Name" and the data object includes data values for metadata values "First Name", "Middle Name", and "Last Name", the data values associated with the "First Name", "Middle Name", and "Last Name" metadata values are merged and entered into the "Name" column cell in the entry of the data object in the table. In some embodiments, one or more data values of the data object may be included in a table multiple times. For example, if a table has headers for "Street", "City", "State", and "Zip", and also has a header for "Address", data values of the data object are placed in all appropriate cells, with the cell for "Address" containing the data used in "Street", "City", "State", and "Zip". In various embodiments, any appropriate matching algorithm may be employed.

Figure 2A:
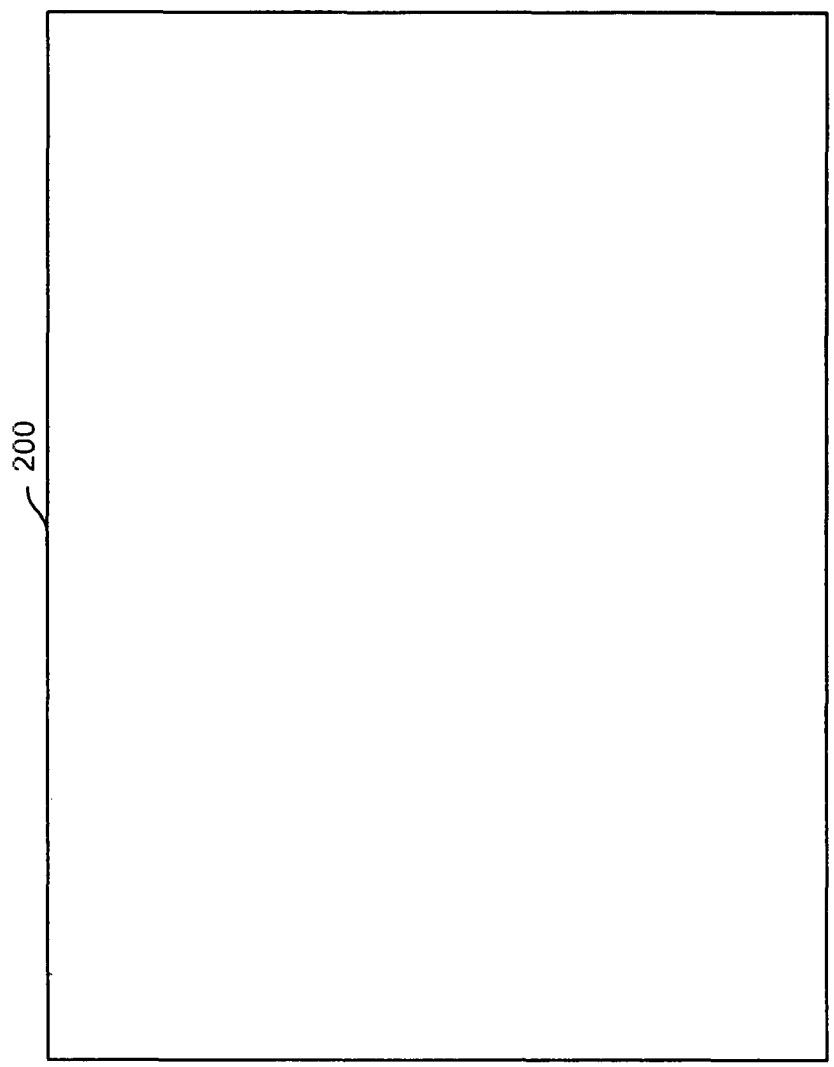
FIG. 2A illustrates an empty sheet.
Figure 2B:
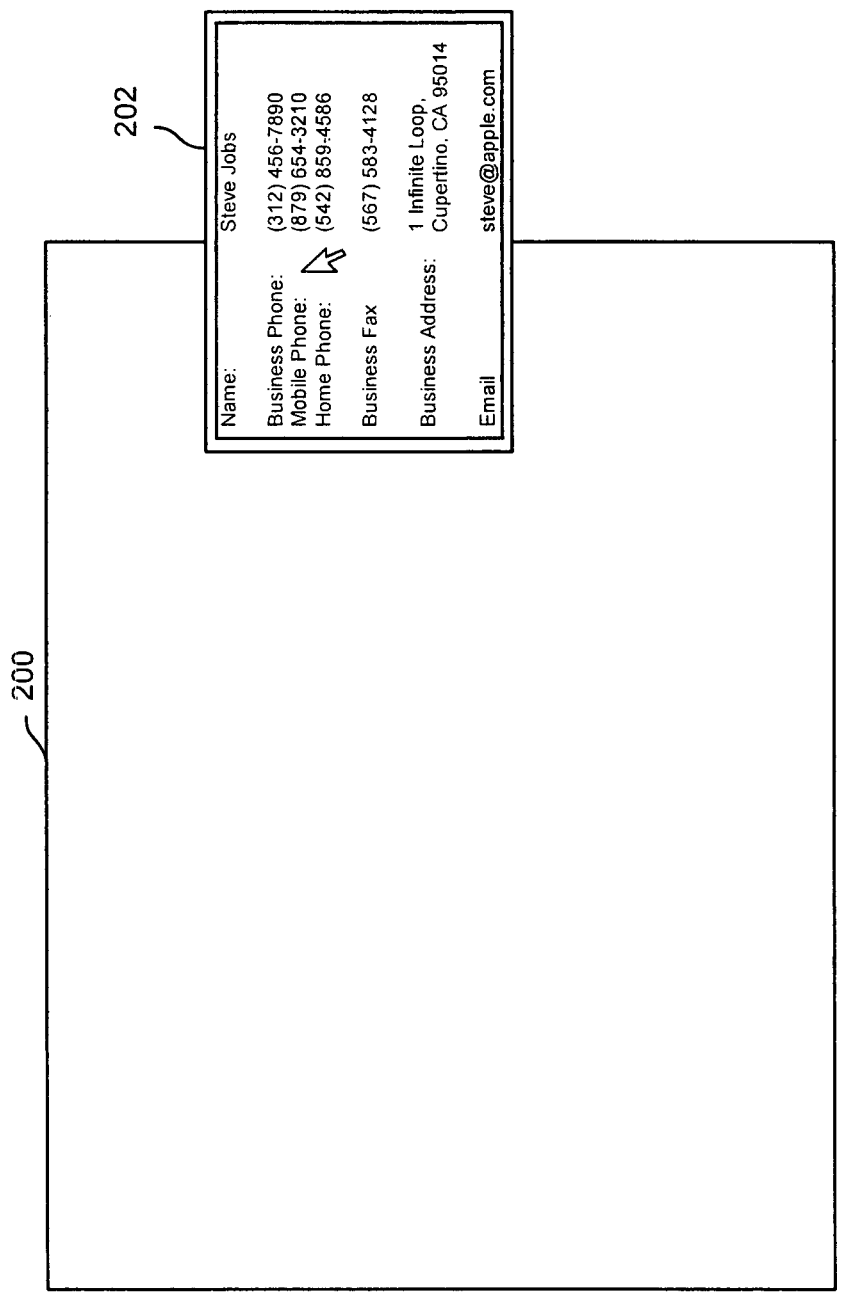
FIG. 2B illustrates dragging a data object onto an empty sheet.
Figure 2C:
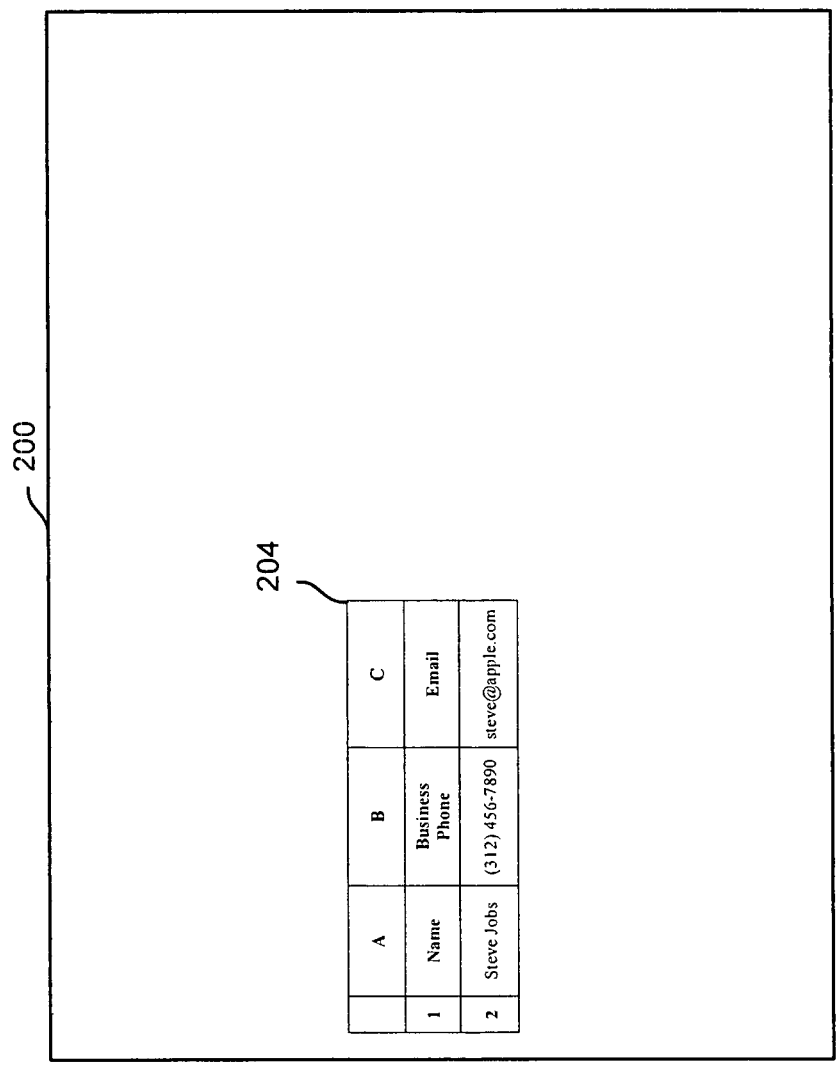
FIG. 2C illustrates the automatic generation of a table.
Figure 2D:
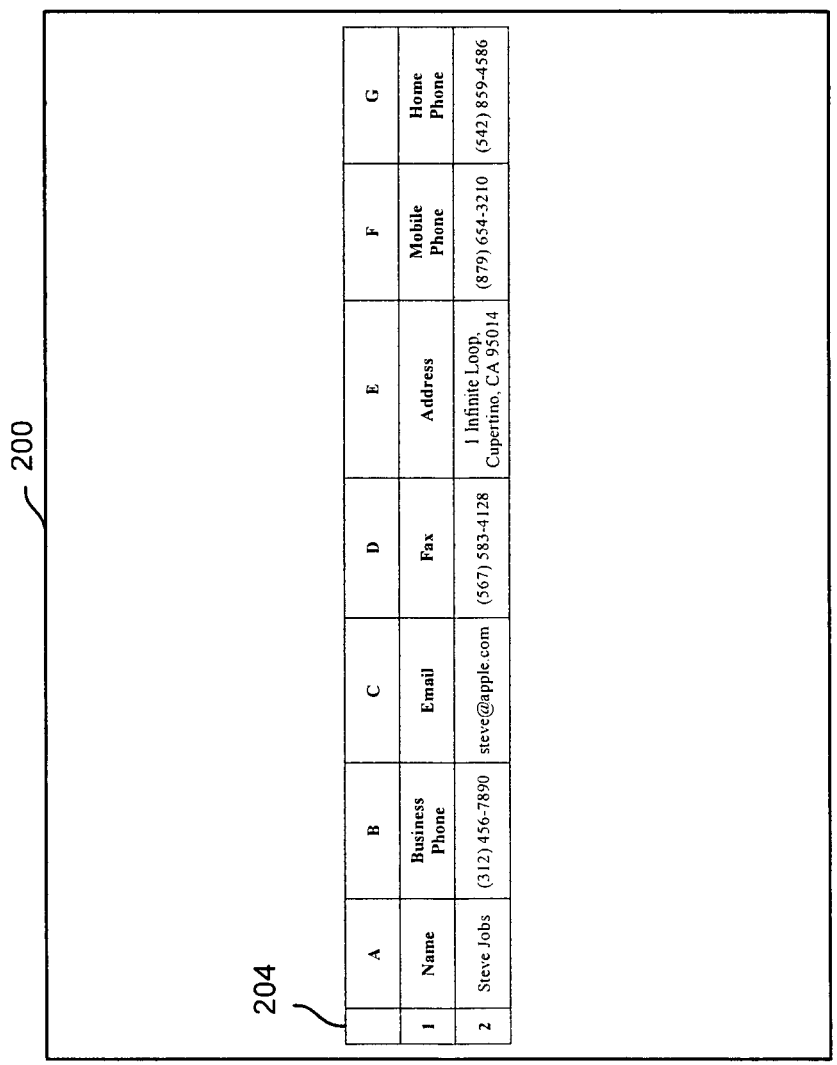
FIG. 2D illustrates a table with all of its columns unhidden.

FIGS. 2A-2D illustrate an embodiment of automatically generating a table when a data object is dragged and dropped onto an empty workspace and a sequence of consecutive states of the workspace, which in the given example comprises a sheet or canvas 200 of a document of a spreadsheet application. FIG. 2A illustrates the starting state of sheet 200. As depicted, sheet 200 is empty. FIG. 2B illustrates dragging an address card 202 associated with, for example, a personal information manager application, onto empty sheet 200. FIG. 2C illustrates the automatic generation of a table 204 in sheet 200 in response to the address card 202 being dropped onto sheet 200. As depicted, table 204 is populated with a selected subset of data values included in address card 202. In the embodiment of the given example, address card files are associated with template header values comprising "Name", "Phone", and "Email" which are used to define the default columns of table 204. Corresponding data values are extracted from address card 202 to populate an entry associated with address card 202. Since address card 202 includes three different metadata values that include "Phone", a most relevant value is selected, e.g., using an associated matching algorithm. As depicted, the "Business Phone" data value of address card 202 is included in table 204, and the metadata value "Business Phone" is used as the header value in table 204 instead of the default template header value "Phone". The described example comprises one embodiment of generating and populating the default "Phone" column of table 204. In other embodiments, the default "Phone" column may be generated and/or populated differently based on the matching algorithm employed. For example, the data values associated with all three metadata values of address card 202 that include "Phone" may be merged and included in a column with default template header value "Phone" in table 204, or, for example, instead of one column, table 204 may be expanded to include three columns whose header values are populated by corresponding metadata values, i.e. "Business Phone", "Mobile Phone", and "Home Phone", to accommodate the three data values of address card 202 whose metadata values matched with default template value "Phone". Although in the example of FIG. 2C, table 204 is by default rendered with only its three associated default columns as defined by its associated template, in some embodiments, the other data values and/or metadata values of address card 202 are extracted from the address card 202 and included in hidden columns of table 204. FIG. 2D illustrates table 204 with all of its columns unhidden.

Figure 3C:
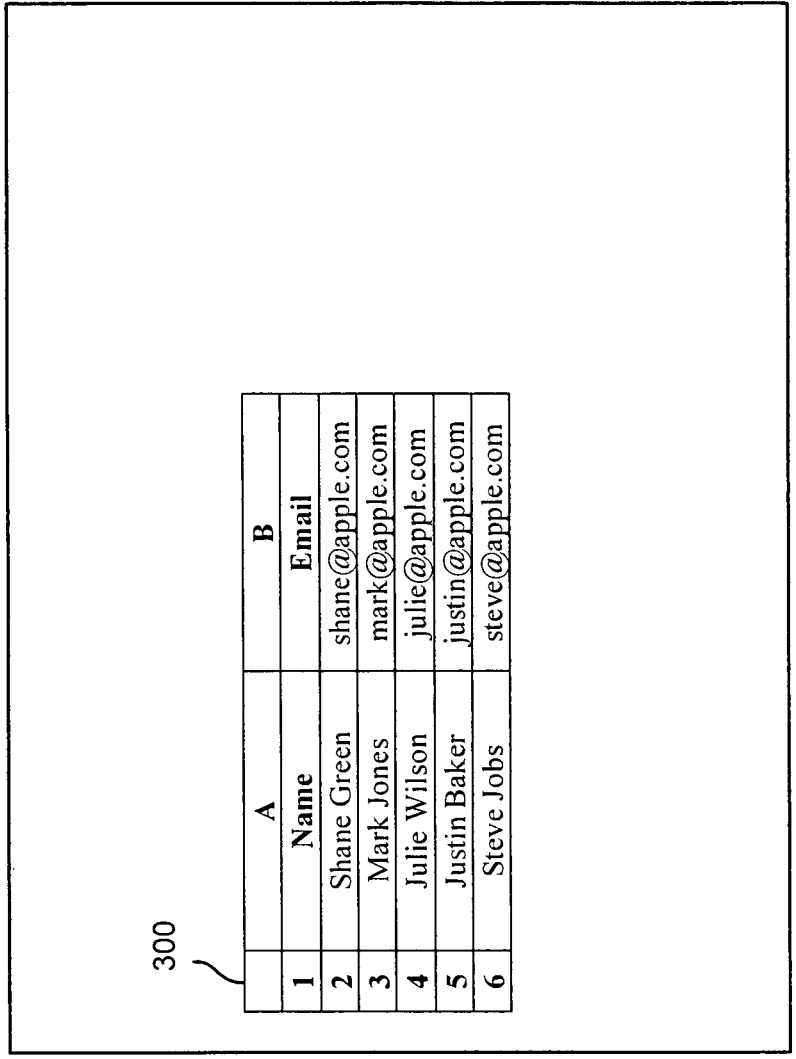
FIG. 3C illustrates the automatic insertion of an entry for a data object into an existing table.

FIGS. 3A-3C illustrate an embodiment of automatically inserting into an existing table an entry for a data object when the data object is dragged and dropped onto the table and a sequence of consecutive states of the table. FIG. 3A illustrates the starting state of table 300. As depicted, table 300 includes two columns with header values "Name" and "Email" and five entries. FIG. 3B illustrates dragging an address card 302 onto table 300. FIG. 3C illustrates the automatic insertion of an entry associated with address card 302 into table 300 in response to the address card 302 being dropped onto table 300. In some embodiments, when a data object is dragged and dropped onto an existing table, only the relevant data values (e.g., "Name" and "Email" in the example of FIGS. 3A-3C) needed to populate an entry associated with the data object in the existing table are extracted from the data object, if available. Alternatively, in some embodiments, other data values and/or metadata values included in the data object may be extracted and included in corresponding cells of associated hidden rows and/or columns added to an existing table.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for automatically populating a table, comprising:
    receiving an indication that at least a portion of a data object comprising a set of one or more data values and a corresponding set of one or more metadata values is to be included in a table, wherein each metadata value comprises a label for its corresponding data value;
    automatically matching the set of metadata values of the data object with a set of one or more table header values associated with an existing or default table definition when there is an exact match and when there is a fuzzy match at least between the one or more labels of the set of metadata values of the data object and the set of one or more table header values associated with the existing or default table definition;
    selecting for inclusion in the table a selected subset of the set of data values of the data object, wherein the selection is based on the metadata value and the header values associated with the existing or default table definition, and each data value in the selected subset has a corresponding metadata value that matches with a header value in the set of header values; and
    automatically including in the table an entry corresponding to the data object, the entry comprising the selected subset of data values of the data object, wherein each data value in the entry is located in a location determined at least in part by its corresponding metadata value and header value with which its corresponding metadata value matches.

2. A method as recited in claim 1, wherein the table comprises an existing table.

3. A method as recited in claim 1, wherein the indication comprises a drag-and-drop of the data object onto the table.

4. A method as recited in claim 1, wherein the indication comprises a drag-and-drop of the data object onto an empty workspace or an empty portion of a workspace.

5. A method as recited in claim 1, comprising automatically generating the table.

6. A method as recited in claim 5, wherein a default structure of the table is defined at least in part by a template associated with a data object type of the data object used to generate the table.

7. A method as recited in claim 6, wherein the set of header values comprises a prescribed set of one or more default header values of the template.

8. A method as recited in claim 1, wherein the selected subset of data values comprises all data values comprising the data object.

9. A method as recited in claim 1, wherein one or more header cells of the table are populated by one or more metadata values of the data object.

10. A method as recited in claim 1, comprising including one or more hidden rows, columns, or both in the table for one or more data values not included in the selected subset.

11. A method as recited in claim 1, wherein the entry comprises a row or column of the table.

12. A method as recited in claim 1, wherein the entry comprises a plurality of entries.

13. A method as recited in claim 1, wherein the table comprises a plurality of tables each of which includes an entry associated with the data object.

14. A method as recited in claim 1, wherein the data object comprises a plurality of data objects.

15. A method as recited in claim 1, wherein the data object comprises a file.

16. A system for automatically populating a table, comprising:
   a processor configured to:
      receive an indication that at least a portion of a data object comprising a set of one or more data values and a corresponding set of one or more metadata values is to be included in a table, wherein each metadata value comprises a label for its corresponding data value;
      automatically match the set of metadata values of the data object with a set of one or more table header values associated with an existing or default table definition when there is an exact match and when there is a fuzzy match at least between the one or more labels of the set of one or more metadata values of the data object and the set of one or more table header values associated with the existing or default table definition;
      select for inclusion in the table a selected subset of the set of data values of the data object, wherein the selection is based on the metadata value and the header values associated with the existing or default table definition, and each data value in the selected subset has a corresponding metadata value that matches with a header value in the set of header values;
      automatically include in the table an entry corresponding to the data object, the entry comprising the selected subset of data values of the data object, wherein each data value in the entry is located in a location determined at least in part by its corresponding metadata value and header value with which its corresponding metadata value matches; and
   a memory coupled to the processor and configured to provide instructions to the processor.

17. A system as recited in claim 16, wherein the table comprises an existing table.

18. A system as recited in claim 16, wherein the processor is configured to automatically generate the table.

19. A system as recited in claim 18, wherein a default structure of the table is defined at least in part by a template associated with a data object type of the data object used to generate the table.

20. A system as recited in claim 16, wherein one or more header cells of the table are populated by one or more metadata values of the data object.

21. A system as recited in claim 16, wherein the processor is configured to include one or more hidden rows, columns, or both in the table for one or more data values not included in the selected subset.

22. A system as recited in claim 16, wherein the entry comprises a row or column of the table.

23. A computer program product for automatically populating a table, the computer program product being embodied in a non-transitory computer readable storage medium and comprising computer instructions to:
   receive an indication that at least a portion of a data object comprising a set of one or more data values and a corresponding set of one or more metadata values is to be included in a table, wherein each metadata value comprises a label for its corresponding data value;
   automatically match the set of metadata values of the data object with a set of one or more table header values associated with an existing or default table definition when there is an exact match and when there is a fuzzy match at least between the one or more labels of the set of metadata values of the data object and the set of one or more table header values associated with the existing or default table definition;
   select for inclusion in the table a selected subset of the set of data values of the data object, wherein the selection is based on the metadata value and the header values associated with the existing or default table definition, and each data value in the selected subset has a corresponding metadata value that matches with a header value in the set of header values; and
   automatically include in the table an entry corresponding to the data object, the entry comprising the selected subset of data values of the data object, wherein each data value in the entry is located in a location determined at least in part by its corresponding metadata value and header value with which its corresponding metadata value matches.

24. A computer program product as recited in claim 23, wherein the table comprises an existing table.

25. A computer program product as recited in claim 23, comprising computer instructions to automatically generate the table.

26. A computer program product as recited in claim 25, wherein a default structure of the table is defined at least in part by a template associated with a data object type of the data object used to generate the table.

27. A computer program product as recited in claim 23, wherein the entry comprises a row or column of the table.

\* \* \* \* \*